United States Patent Office 3,642,923
Patented Feb. 15, 1972

3,642,923
PRODUCTION OF POLYCYCLIC HYDROCARBONS
Richard Gregory Foster, Runcorn, and David Richard Joy, Stockton-on-Tees, England, assignors to Imperial Chemical Industries Limited, London, England
No Drawing. Filed May 6, 1970, Ser. No. 35,276
Claims priority, application Great Britain, May 9, 1969, 23,778/69; July 22, 1969, 36,829/69
Int. Cl. C07c *3/00, 13/54, 13/62*
U.S. Cl. 260—666 PY                                   16 Claims

ABSTRACT OF THE DISCLOSURE

Polycyclic bridged ring compounds are produced by a two-stage process in which a substituted cyclic hydrocarbon such as norbornenyl chloride is condensed with an acyclic conjugated diolefine, e.g. butadiene, isoprene etc. and the substituents from the cyclic hydrocarbon subsequently removed to produce a double bond. A preferred substituent is a halogen eliminated as a hydrogen halide. The substituted cyclic hydrocarbon may itself be produced from cyclopentadiene or a norbornene by reaction with an acyclic substituted olefine such as vinyl chloride. The products of the process have utility as termonomers in EPT rubbers, 1,4-endomethylene-6-methyl-1,4,5,8,9,10-hexahydronaphthalene being particularly useful in this respect.

The present invention relates to the production of polycyclic hydrocarbons.

According to the invention a process for the production of polycyclic hydrocarbons of structure:

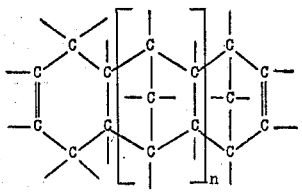

in which $n$ is zero or a whole number, comprises condensing a substituted cyclic hydrocarbon of formula:

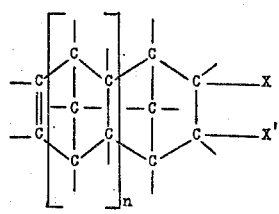

with an acyclic conjugated diolefine of structure

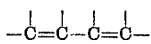

and eliminating XX' from the intermediate compound so formed. $n$ is preferably a small whole number, e.g. 1 to 6. When $n$ is zero the substituted cyclic hydrocarbon is a substituted norbornene.

X and X' which may be the same or different are atoms or groups which, when linked to a carbon atom which is itself attached by a single bond to a carbon atom linked to a like atom or group, are capable of removal as XX' to form a double bond between said carbon atoms.

The cyclic hydrocarbon starting materials for the present invention may be prepared by reaction of cyclopentadiene with a norbornene of formula:

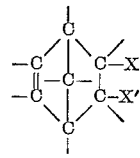

and also by reaction of cyclopentadiene with an acyclic substituted olefine of formula

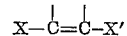

The value of $n$ in the substituted cyclic hydrocarbon is then determined by the molar proportion of cyclopentadiene to norbornene compound or olefine used. For example, to prepare a substantial proportion of the substituted cyclic hydrocarbon in which $n=1$, a molar proportion of cyclopentadiene to norbornene compound in the range 0.75:1 to 1.25:1 or a molar proportion of cyclopentadiene to acyclic substituted olefine in the range 1.75:1 to 2.25:1 is suitable. Alternatively, if it is desired to prepare a substituted cyclic hydrocarbon in which $n=0$ it is preferred to have at least 1.5 mole of acyclic substituted olefine per mole of cyclopentadiene and more preferably at least 2.0 moles per mole of cyclopentadiene, a suitable range being 1.5 to 4 moles. In these reactions dicyclopentadiene may be used in place of cyclopentadiene provided that the temperature of the reaction is above that at which dicyclopentadiene dissociates to cyclopentadiene at a rate faster than the reverse reaction.

X and/or X' may suitably be hydrogen, or a halogen such as chlorine. Alternatively X may be hydrogen, X' hydroxyl and the double bond formed by dehydration. Preferably X' is hydrogen and X is an ester group, particularly an ester derived from a lower alkanoic acid containing up to six carbon atoms, e.g. acetate, or X' is hydrogen and X is a halogen such as chlorine. Particularly effective substituted acyclic olefines are vinyl derivatives such as vinyl acetate or vinyl chloride in which X is acetate or chlorine eliminated from the intermediate compound as acetic acid or hydrogen chloride respectively. X and X' may also form part of an acid anhydride group such as is obtained if maleic anhydride is the substituted olefine. The removal of XX' may be carried out in a number of ways, e.g., by pyrolysis at a temperature up to 700° C., e.g. when X and X' are hydrogen; catalytically, e.g. using a platinum, chromium, molybdenum, tungsten or vanadium catalyst, e.g. when X and X' are hydrogen; chemically, e.g. removal of halogen halide by a base such as potassium tert. butoxide or the removal of adjacent halogen atoms by a metal such as zinc, or electrolytically, e.g. the removal of adjacent carboxyl groups as carbon dioxide by electrolysis of the dipotassium salt of the dibasic acid. If desired X and X' in the reactant may be converted to more readily removable atoms or groups after the formation of the intermediate compound. For example, X may be hydrogen and X' may be an ester group in the substituted cyclic hydrocarbon, but the ester group in the intermediate compound may be converted to a hydroxyl group which is then eliminated by dehydration. When a hydrogen halide is eliminated by a base it is preferred that the base be an alkali or alkaline earth metal alkoxide, particularly a sodium or potassium alkoxide. The alkoxide of an alcohol, particularly an alkanol, containing 4 to 20, especially 4 to 10 carbon atoms, is preferred, e.g. sodium iso-octoxide, although the alkali or alkaline earth metal salt of a di- or tri-hydric alkanol containing up to 20 carbon atoms, may also be used. When an alkoxide is used in the elimination reaction the reaction may be carried out in the alcohol from which the alkoxide is derived. In this case the temperature is suitably 100 to 350° C., preferably 150 to 270° C., more preferably 180 to 250° C. Alternatively an inert solvent, particularly a polar solvent such as dimethyl sulphoxide, an ether, e.g. diethyl ether or tetrahydrofuran, an ester, e.g. dinonylphthalate, an amide such as acetamide, dimethylacetamide or dimethylformamide or sulpholane, may be present and the elimination reaction may be carried out using a base in such a solvent at a temperature in the range 50–150° C. The pressure for the elimination of hydrogen halide by means of a base is suitably that generated in a sealed system at the temperature of operation, e.g. up to 100 atms., more usually up to 50 atms.

The residual valencies in the cyclopentadiene and the norbornene or substituted acyclic olefine (and hence in the substituted cyclic hydrocarbon) and also in the acyclic conjugated diolefine may be satisfied by hydrogen or by hydrocarbon or non-hydrocarbon substituents, provided that these do not adversely affect the reactions taking place. Suitable hydrocarbon substituents include aryl groups which may also be substituted, particularly phenyl and substituted phenyl groups, and alkyl groups, particularly lower alkyl groups containing up to six carbon atoms, e.g. methyl or ethyl groups. The halogens, particularly chlorine or bromine, are examples of non-hydrocarbon substituents. Cyclopentadiene is a favoured reactant with vinyl acetate or vinyl chloride to yield 6-chloro or 6-acetoxy-norbornene-2. The preferred acyclic conjugated diolefine is isoprene because this leads to the production of an especially valuable product when reacted with the 6-substituted or 5,6-disubstituted norbornene, but other conjugated diolefines, such as butadiene and 2,3-dimethyl-butadiene, may also be used.

The reaction of the substituted cyclic hydrocarbon with the acyclic conjugated diolefine may take place at elevated temperature and pressure depending on the nature of the cyclic hydrocarbon and the diolefine. Thus, temperatures in the range 0° to 300° C., preferably 50° to 250° C., and autogeneous pressures, e.g. up to 100 atmospheres, preferably 1 to 50 atmospheres, may be used. When norbornenyl chloride is a reactant or product, the preferred temperature is 0 to 180° C. to minimise isomerisation to the nortricyclyl derivative which takes place at higher temperatures. The reaction between the substituted cyclic hydrocarbon and the acyclic conjugated diolefine may take place in an excess of the substituted cyclic hydrocarbon, e.g. in the range 2:1 to 5:1 of substituted cyclic hydrocarbon to conjugated acyclic diolefine, or an inert solvent may be present. Suitably an aprotic solvent may be used, e.g. an ether such as diethylether, or tetrahydrofuran, an ester such as dinonylphthalate, an aromatic hydrocarbon such as benzene or xylene, an alcohol such as ethanol, or a cycloparaffin or paraffin such as cyclohexane or n-octane respectively.

The reaction between the cyclopentadiene and the norbornene or acyclic substituted olefine may also take place at elevated temperature and pressure. Temperatures in the range 0° to 300° C., preferably 150 to 250° C., and autogenous pressures up to 100 or more, e.g. 200, atmospheres, preferably 50 to 100 or 50 to 200 atmospheres, may be employed. The reaction may be carried out in the presence or absence of an inert solvent, suitable solvents being those described in the preceding paragraph. If desired, the substituted cyclic hydrocarbon may be prepared and then reacted in situ with the acyclic conjugated diolefine without further separation.

Both Diels-Alder reactions may be carried out, if desired, in the presence of a catalyst. Suitable catalysts include strong acids, e.g., trichloroacetic acid, nitrogeneous bases, e.g. trimethylamine and dimethylaniline, compounds such as 1,3,5-trinitrobenzene, and transition metals and transition metal complexes, particularly monovalent rhodium complexes, such as are described in British patent specification No. 1,121,642.

By using the processes disclosed herein cyclic compounds of general formula:

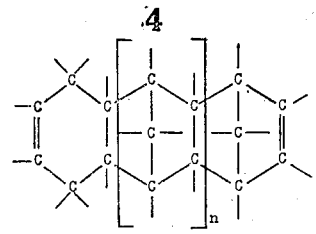

may be produced from such readily available substances as cyclopentadiene or a substituted cyclopentadiene, an acyclic substituted olefine of formula $$X=C=C=X'$$

and an acyclic conjugated diolefine. The products of the process are useful as termonomers in ethylene/propylene copolymers. For this purpose it is preferred that one of the doubly bonded carbon atoms in the cyclohexene ring should be substituted by a lower alkyl group such as a methyl group. A particularly useful termonomer is that in which $n$ in the general formula is zero, i.e. 1,4-endo-methylene-1,4,5,8,9,10-hexahydronaphthalene and its derivatives, especially those in which one or both of the doubly bonded carbon atoms in the cyclohexene ring is substituted by a lower alkyl group, e.g. an alkyl group containing up to six carbon atoms such as a methyl group. One such compound, 1,4-endomethylene-6-methyl-1,4,5,8,-9,10-hexahydronaphthalene may be prepared by reacting vinyl chloride with cyclopentadiene to form norbornenyl chloride and eliminating hydrogen chloride from the latter.

If desired mixtures of acyclic conjugated diolefines, e.g. isoprene and 1,3-dimethylbutadiene such as are obtained as a refinery distillation stream may be used to give a mixed product suitable as a comonomer. Alternatively, a similar refinery distillation stream, e.g. containing hydrocarbons of 4 to 8 carbon atoms, may be treated to remove all but one conjugated diene and the mixture remaining containing the one conjugated diene may then be used without further purification, the residual paraffins and/or mono-olefins not interfering with the reaction. For example, such a "concentrated" refinery stream may contain isoprene as the sole conjugated diene and be suitable for use in the present process.

The polycyclic products of the process generally have structures in which the cyclohexene ring is in the exo-position with respect to the adjacent norbornyl or norbornenyl structure, although the corresponding endo compound may also be produced. When a norbornene is produced by reacting vinyl chloride as the acyclic substituted olefine with cyclopentadiene and the norbornene is then reacted with isoprene, an intermediate compound is produced in which the cyclohexene ring is in the exo-position almost exclusively, and the corresponding exo-naphthalene, produced by eliminating HCl from the 1,4-endomethylene - 6 - methyl - 1,4,5,8,9,10 - hexahydro-produced by eliminating HCl from the product, is an especially valuable polymer intermediate because we have found that the exo-form incorporates more readily into the polymer than does the endo-form.

The invention will now be further described with reference to the following examples.

EXAMPLE 1

Vinyl acetate may be reacted with cyclopentadiene to give norbornenyl acetate by the method described in Organic Reactions, Vol. IV, page 92.

Isoprene (90 grams) and norbornenyl acetate (194 grams) were heated in an autoclave at 170° C. for 2 hours. The product was distilled at 10 mm. pressure, the fraction distilling between 140° and 148° C. being colletced.

This intermediate was passed through a stainless steel tube at 600° C. to produce a product containing 1,4-endomethylene-6-methyl - 1,4,5,8,9,10 - hexahydronaphthalene (4-methyl-tricyclo-[6,2,1,0²⁻⁷]-undecadiene-4,9).

EXAMPLE 2

Norbornenyl chloride, B.P. 50° to 60° C. at 10 mm. pressure, was prepared by reacting 320 grams vinyl chloride and 175 grams dicyclopentadiene in an autoclave at 190° C., for 3 hours.

Isoprene (50 ml.) and norbornenyl chloride (80 ml.) were reacted in an autoclave at 170° C., for 3 hours.

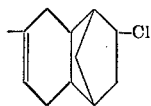

was separated by distillation, boiling point 100° C./0.5 mm.

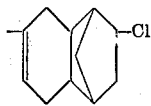

(26 gm.) and potassium tertiary butoxide (13.4 gm.) were refluxed at 190° to 200° C. for 15 minutes and cooled.

Water was added to the solution which was then extracted with ether. The ethereal solution was washed with water, dried and evaporated. The residue remaining after evaporation was fractionated to give 1,4-endomethylene-6-methyl - 1,4,5,8,9,10 - hexahydronaphthalene boiling at 80° to 85° C./10mm. This was shown by nuclear magnetic resonance to contain only the isomer in which the cyclohexene ring was exo to the norbornene structure. Further fractions boiling at 85° to 110° C./10 mm. and 110° to 120° C./10 mm. were also obtained. The latter comprised

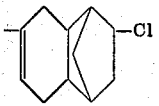

EXAMPLE 3

2-chloro-6-methyl - 1,4 - endomethylene-1,3,4,5,8,9,10-heptahydronaphthalene was prepared as described in the first part of Example 2.

Ethylene glycol (30 mls.), sodium hydroxide (10 grams) and 20 grams of the heptahydronaphthalene were charged to a flask fitted with a condenser and stirrer and heated under reflux with stirring for 24 hours. After cooling the contents of the flask were diluted with water and extracted three times with ether. The ethereal solution was dried and evaporated to give an oil (9 grams) containing 70% of 1,4-endomethylene-6-methyl-1,4,5,8,9,-10-hexahydronaphthalene.

EXAMPLE 4 [1]

A stainless steel autoclave was flushed with nitrogen and charged with 186 parts of dicyclopentadiene and 325 parts of vinyl chloride. The autoclave was then sealed, heated to a temperature of 190° C., maintained at this temperature for 3 hours, allowed to cool to room temperature and vented, and the unreacted vinyl chloride allowed to evaporate.

The contents of the autoclave were charged to a distillation apparatus and distilled through a 2 ft. silvered, vacuum jacketed column packed with glass helices. An initial fraction distilling at temperatures up to 50° C. at 15 mm. Hg pressure was discarded and two further fractions were collected: norbornenyl chloride, 70.5 parts, distilling at 52° C. at 15 mm. Hg pressure, and

[1] All parts are parts by weight.

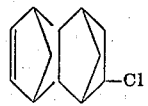

49 parts, distilling in the range 140° C. to 148° C. at 15 mm. Hg pressure. 13.5 parts of undistilled residue remained in the distillation flask.

A stainles steel autoclave was flushed with nitrogen and charged with 224 parts of

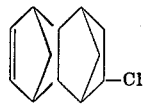

and 40 parts of isoprene. The autoclave was sealed, heated to a temperature of 170° C., maintained at this temperature for 3 hours and thereafter allowed to cool and the contents of the autoclave charged to a distillation apparatus and distilled through a 2 ft. silvered vacuum jacketed column packed with glass helices.

13 parts of an initial fraction distilling at temperatures up to 118° C., at 7 mm. Hg pressure was discarded and three further fractions were collected: 117 parts of unreacted

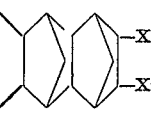

distilling at 118° C., to 135° C., at a 7 mm. Hg pressure (mainly 125° C.), 30 parts of a fraction distilling at 135° C. to 162° C. at 7 mm. Hg pressure and 465 parts of

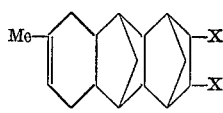

wherein one of the group X and X' is hydrogen and the other is chlorine, distilling at 162° C. to 195° C. at 7 mm. Hg pressure (mainly 192° C.). 44 parts of

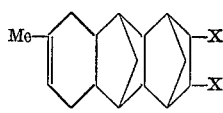

wherein one of the groups X and X' is hydrogen and the other is chlorine, were charged to a flask fitted with a stirrer and reflux condenser and were heated to a temperature of 200° C. 16 parts of potassium tertiary butoxide were gradually added to the flask over a period of 30 minutes. After the addition had been completed the contents of the flask were allowed to cool and were poured into water and extracted three times with ether. The ether extract was dried by standing over anhydrous sodium sulphate for 2 hours. The ether was then evaporated and the residue distilled through a 2 ft. long Vigreux column and 13 parts of a fraction of

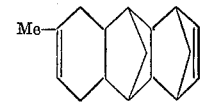

distilling in the range 160° C. to 190° C. at 8 mm. Hg was collected.

EXAMPLE 5

Isoprene was reacted with norbornenyl acetate as in Example 1. The intermediate so formed was passed in a stream of nitrogen through a bed of γ-alumina at 300° C. The bed volume was 30 ccs., the nitrogen flow-rate 20 litres/hour, the residence time of the acetate in contact with the bed being approximately 5 secs. Approximately 20 grams of the acetate were passed through the column in 50 to 90 minutes. The product composition was determined by nuclear magnetic resonance spectrometry, mass spectrometry and gas-liquid chromatography. Conversion of the acetate to 1,4-endomethylene-6-methyl-1,4,5,8,9,10 - hexahydro - naphthalene was found to be 21.8%.

EXAMPLE 6

Norborenyl chloride and isoprene were reacted together in a 1 litre "Inconel" AE autoclave ("Inconel" is a trademark) at temperature between 170 and 210° C. at autogenous pressure. The products were analyzed by nuclear magnetic resonance and gas-liquid chromatography. The results obtained were as follows:

| Expt. No. | Norbornenyl chloride/ isoprene ratio | Temp., °C. | Time, hrs. | Norbornenyl chloride conversion, percent | Percent yield of EMHN chloride[1] on norbornenyl chloride converted |
|---|---|---|---|---|---|
| 1 | 4:1 | 170 | 3 | 14.9 | 94.6 |
| 2 | 4:1 | 190 | 3 | 19.5 | 82.0 |
| 3 | 4:1 | 210 | 3 | 23.1 | 57.4 |
| 4 | 2:1 | 170 | 3 | 22.2 | 95.2 |
| 5 | 2:1 | 210 | 3 | 35.8 | 46.7 |
| 6 | 4:1 | 170 | 9 | 23.8 | 95.0 |

[1] EMHN chloride=2-chloro-6-methyl-1,4-endomethylene-1,3,4,5,8,9,10-heptahydronaphthalene;

EXAMPLE 7

A 1 litre "Inconel" AE autoclave fitted with cooling coils and heating mantle was charged with weighed quantities of dicyclopentadiene and vinyl chloride. The autoclave and contents was then heated to the required temperature and maintained there for a preset reaction time. At the end of the reaction the autoclave was cooled to 40° C. and the excess vinyl chloride flashed off, condensed in catchpots cooled in a methanol/solid carbon dioxide cooling mixture and weighed. The reaction product was analysed by gas-liquid chromatography.

| Expt. No. | Reaction time and temperature | Mole ratio VC[1]:CPD[2] | Exo NBC[3]: endo NBC[3] | Wt. of NBC[3] made, g. | Yield NBC[3] on VC[1] | Yield NBC on DCPD[4] | Conversion VC,[1] percent | Conversion DCPD,[4] percent |
|---|---|---|---|---|---|---|---|---|
| 1 | ½ hr., 190° C | 2.15 | 1.87 | 123.8 | 93.4 | 49.3 | 15.8 | 64.5 |
| 2 | 1 hr., 190° C | 2.24 | 1.59 | 239 | 90.9 | 80.2 | 30.2 | 77.0 |
| 3 | 2½ hr., 190° C | 1.91 | 1.72 | 253.7 | 81.1 | 68.4 | 42.2 | 95.2 |
| 4 | 2½ hr., 190° C | 2.22 | 1.71 | 327.9 | 90.5 | 88.2 | 47.9 | 95.6 |
| 5 | 2 hr., 190° C | 1.65 | 1.67 | 264.7 | 80.2 | 62.8 | 43.5 | 94.5 |
| 6 | 2 hr., 190° C | 4.06 | 3.1 | 131.0 | 57.8 | 57.5 | 23.9 | 97.5 |
| 7 | 2 hr., 190° C | 2.23 | 1.36 | 287 | 91.8 | 78.1 | 37.0 | 94.5 |

[1] VC=Vinyl chloride.  [2] CPD=Cyclopentadiene.  [3] NBC=Norbornenyl chloride.  [4] DCPD=Dicyclopentadiene.

EXAMPLE 8

2 - chloro - 6 - methyl-1,4-endomethylene-1,3,4,5,8,9,10-heptahydronaphthalene was prepared as in Example 2.

0.5 mole of the heptahydronaphthalene was heated to 200° C. with one mole of sodium tert.butoxide in tert. butanol. After 2 hours 77% of the 2-chloro-heptahydronaphthalene had been converted to 1,4-endomethylene-6-methyl-1,4,5,8,9,10-hexahydronaphthalene.

EXAMPLES 9 TO 11

In the following examples norbornenyl chloride and the dienes named were reacted by heating in an autoclave and the reaction product isolated by distillation.

| Example | Norbornenyl chloride | Diene | Reaction conditions | Product | Yield,[1] g. | Boiling point |
|---|---|---|---|---|---|---|
| 9 | 256 g. (2 moles) | 2:3 dimethyl butadiene 41 g. (0.5 mole) | 170°, 20 hours |  | 57.5 (55.6%) | 161-165° C. at 6 mm. |
| 10 | 512 g. (4 moles) | Piperylene 136 g. (2 moles) | 170° C., 24 hours | 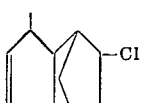 | 140 (36%) | 116-130° C. at 10 mm. |
| 11 | 256 g. (2 moles) | Butadiene 54 g. (1 mole) | 170° C., 20 hours |  | 112 (62%) | 120-122° C. at 10 mm. |

[1] Percent yield is expressed as weight percent based on complete reaction of the diene with norbornenyl chloride.

Elimination of HCl from the norbornenyl chloride/diene adduct 3.45 grams of sodium were reacted with 150 mls. of tert.-butanol in a rocking autoclave at a temperature of 160° C. for 3 hours. The autoclave was then cooled and opened and the norbornenyl chloride/diene adduct charged and the autoclave reheated under the conditions given in the following table. The products were separated by distillation.

| Example | Adduct | Weight of adduct, g. | Reaction conditions | Product | Yield, g. | Boiling point |
|---|---|---|---|---|---|---|
| 9 | 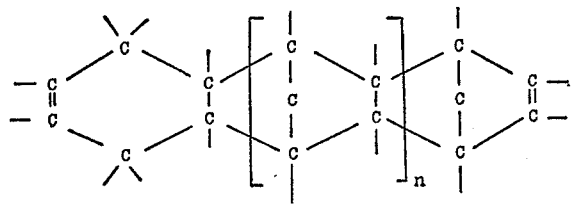 | 26.8 | 200° C., 2 hours | | 14.7 (66%) | 60-70° C. at 1 mm. |
| 10 | 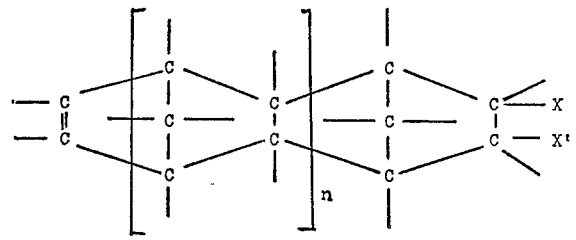 | 20 | 200° C., 2 hours | | 12 (73.5%) | 90-95° C. at 20 mm. |
| 11 | 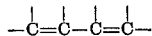 | 46 | 200° C., 2 hours | | 23.5 (63%) | 80-82° C. at 12 mm. |

We claim:
1. A process for the production of polycyclic hydrocarbons of structure in which n is zero to six, which comprises condensing a substituted cyclic hydrocarbon of formula with an acyclic conjugated diolefine of structure $$-\overset{|}{C}=\overset{|}{C}-\overset{|}{C}=\overset{|}{C}-$$

and eliminating XX' from the intermediate compound so formed, the residual valencies in the substituted cyclic hydrocarbon and acyclic conjugated diolefine being satisfied by hydrogen, halogen or alkyl groups and X and X' selected from the group consisting of hydrogen, halogen and ester groups.

2. The process of claim 1 in which the alkyl group is a lower alkyl group containing up to six carbon atoms.

3. The process of claim 1 in which X is hydrogen, X' halogen and XX' is eliminated as a hydrogen halide by means of a base.

4. The process of claim 3 in which the base is an alkali or alkaline earth metal alkoxide of an alcohol containing 4 to 20 carbon atoms.

5. The process of claim 4 in which the elemination of the hydrogen halide is carried out in the alcohol from which the alkoxide is derived.

6. The process of claim 5 in which the elimination of the hydrogen halide is carried out at a temperature in the range 150 to 270° C.

7. The process of claim 1 in which the substituted cyclic hydrocarbon is condensed with the acyclic conjugated diolefine at a temperature in the range 50 to 250° C.

8. The process of claim 1 in which the substituted cyclic hydrocarbon is condensed with the acyclic conjugated diolefine at a pressure in the range 1 to 50 atmospheres.

9. The process of claim 1 in which the substituted cyclic hydrocarbon is condensed with the acyclic conjugated diolefine in an inert solvent or in an excess of the substituted cyclic hydrocarbon.

10. The process of claim 1 in which the substituted cyclic hydrocarbon is produced by the reaction of cyclopentadiene with either a norbornene of formula

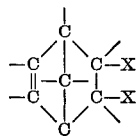

or with an acyclic substituted olefine of formula $$X-\overset{|}{C}=\overset{|}{C}-X$$

11. The process of claim 10 in which the molar proportion of cyclopentadiene to the norbornene is in the range 0.75:1 to 1.25:1 or the molar ratio of the cyclopentadiene to the acyclic substituted olefine is in the range of 1.75:1 to 2.25:1.

12. The process of claim 10 in which the molar proportion of acyclic substituted olefine to cyclopentadiene is at least 1.5:1.

13. The process of claim 10 in which the pressure is up to 200 atmospheres and the temperature in the range 0° to 300° C.

14. The process of claim 10 in which an inert solvent is present.

15. The process of claim 10 in which cyclopentadiene is reacted with vinyl chloride at a temperature in the range 0° to 300° C. and under autogeneous pressure the molar ratio of vinyl chloride to cyclopentadiene being at least 2:1 and the norbornenyl chloride so formed is condensed with isoprene in a 2:1 to 5:1 molar excess of norbornenyl chloride at a temperature in the range 0° to 180° C. and under autogeneous pressure and hydrogen chloride is eliminated from the 2-chloro-6-methyl-1,4-endomethylene - 1,3,4,5,8,9,10 - heptahydronaphthalene so formed by reaction with the sodium alkoxide of a $C_4$ to $C_{20}$ alkanol in the alkanol as solvent at a temperature in the range 150 to 270° C. to produce 1,4-endomethylene-6-methyl 1,4,5,8,9,10-hexahydronaphthalene.

16. The process of claim 15 in which said isoprene is contained in admixture with paraffins and/or mono-olefines which mixture is derived from a refinery distillation stream by removal of conjugated diolefines other than said isoprene.

References Cited

UNITED STATES PATENTS

| | | | |
|---|---|---|---|
| 3,156,676 | 11/1964 | Dekking | 260—88.2 |
| 3,246,044 | 4/1966 | Wood et al. | 260—668 |
| 3,274,273 | 9/1966 | Lester et al. | 260—666 A |
| 3,356,688 | 12/1967 | Mark | 260—648 C |
| 2,952,710 | 9/1960 | Fields | 260—648 C |
| 3,345,419 | 10/1967 | Tinsley | 260—617 |

OTHER REFERENCES

Kurt Alder et al., Liebigs Ann. Chem. Bd. 627, pp. 47–59, 1959.

HERBERT LEVINE, Primary Examiner

V. O'KEEFE, Assistant Examiner

U.S. Cl. X.R.

260—648 C